Nov. 2, 1965    M. SAPOFF ETAL    3,214,978
HYPSOMETER
Filed March 23, 1962    2 Sheets-Sheet 1
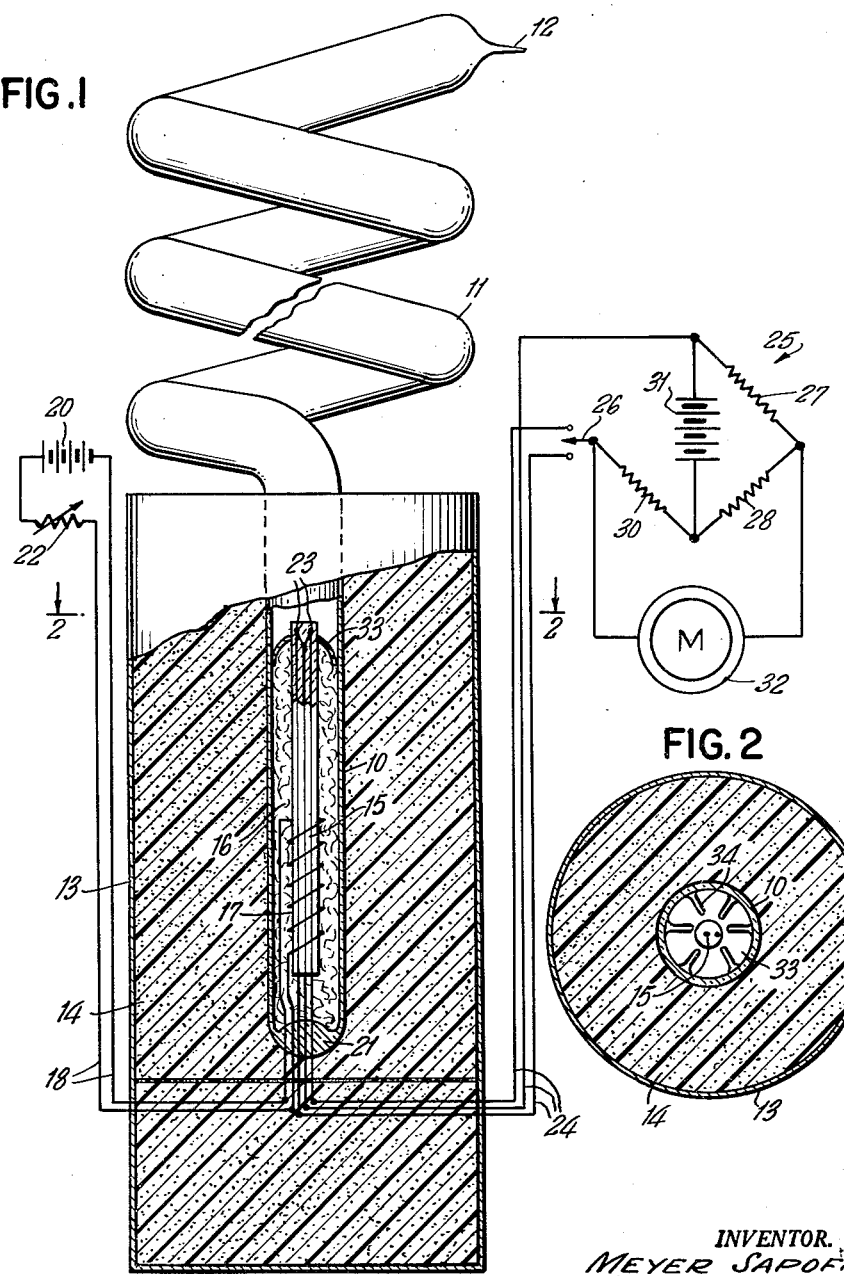
INVENTOR.
MEYER SAPOFF
JOHN GECSEY
BY Albert F. Kronman
ATTORNEY Nov. 2, 1965    M. SAPOFF ETAL    3,214,978
HYPSOMETER
Filed March 23, 1962                2 Sheets-Sheet 2
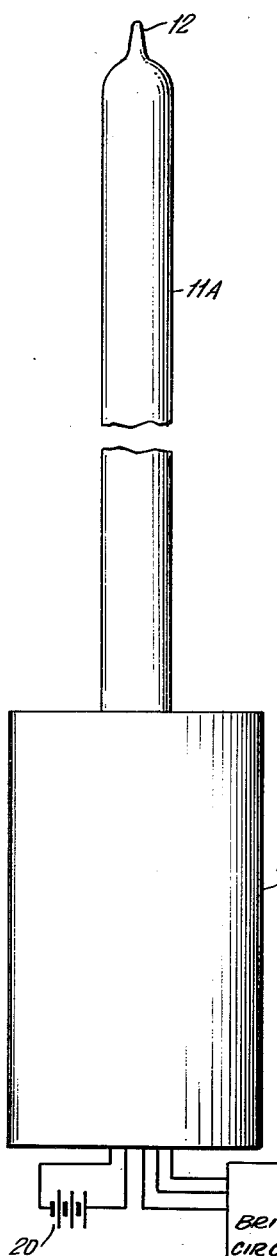
FIG. 3
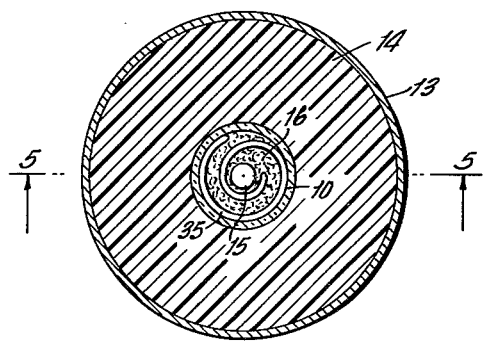
FIG. 4
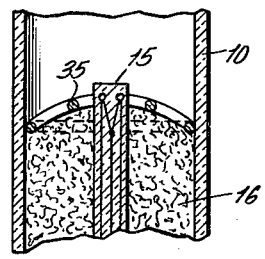
FIG. 5
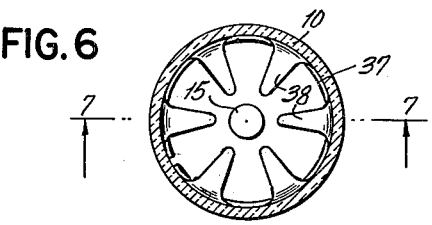
FIG. 6
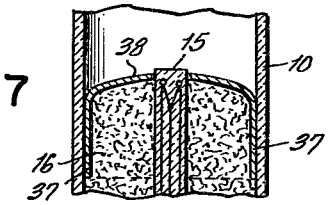
FIG. 7
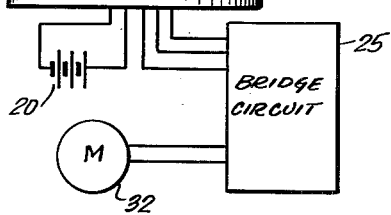
INVENTOR.
MEYER SAPOFF
JOHN GECSEY
BY Albert F. Kaufman
ATTORNEY

United States Patent Office 3,214,978
Patented Nov. 2, 1965

3,214,978
HYPSOMETER
Meyer Sapoff, West Orange, and John Gecsey, Rahway, N.J., assignors to Victory Engineering Corporation, Springfield, N.J., a corporation of Delaware
Filed Mar. 23, 1962, Ser. No. 181,891
4 Claims. (Cl. 73—388)

This invention relates to pressure measuring instruments of the hypsometer type. The apparatus includes a liquid enclosed in a container with means for heating the liquid. A temperature responsive element whose resistance varies with the temperature is arranged to determine the boiling point of the liquid at a position close to the liquid surface. Since the boiling point of a liquid varies with the surrounding gas pressure the temperature of the boiling liquid is a function of the pressure.

Some prior hypsometers have positioned temperature measuring devices at various points within the boiler tube and have connected these measuring devices by lead-in wires running out the top of the tube, these structures result in additional heat loss and therefore require an appreciably larger amount of current for their operation. The lead-in wires above the liquid produce a slight error by the formation of condensation at a point where vapor temperature is cooler than true vapor temperature. The present invention eliminates this error by positioning the temperature measuring device at the surface of an absorbent wick which is always saturated with the liquid. The lead-in wires are enclosed within the wick material and sealed into the base of the boiler tube. In this manner the heat generated by the current connected to the temperature measuring device is applied only to the liquid and not to the vapor above the liquid surface.

Conductors which are present in the vapor portion of the tube also cause inaccurate readings by forming a path for the condensed vapors, permitting cooled drops of the liquid to drip onto the wick in the vicinity of the thermistors and give a false reading.

One of the objects of the present invention is to provide an improved pressure measuring instrument which avoids one or more of the disadvantages and limitations of prior art arrangements.

An object of the present invention is to provide a pressure measuring instrument having an extended condensing chamber in the form of a helix or in the form of a long straight tube which effectively prevents any of the vapor from escaping into the atmosphere.

Another object of the present invention is to increase the accuracy of measuring pressures by positioning all of the heat generating electrical wiring below the surfaces of the boiling liquid.

Still another object of the present invention is to provide a sealed-off condensing chamber which may be stored for an indefinite length of time without danger of evaporating the liquid. The tip of the condensing chamber is broken off just prior to use.

The invention includes a liquid with a high boiling point enclosed within a container having a helical condensing chamber and means for heating the liquid to its boiling temperature. A temperature responsive element, such as a thermistor, is positioned at the surface of an absorbent wick which is in contact with the liquid. An electric heater element is wound around the wick and all the wires connected to the heater element and the temperature measuring device are sealed in the bottom of the container for connection to external circuits.

The invention consists of the construction, combination and arrangements of parts, as herein illustrated, described and claimed.

In the accompanying drawings, forming a part hereof is illustrated one form of embodiment of the invention and in which:

FIGURE 1 is a side view of the hypsometer, with parts broken away to show the internal construction of the boiler tube.

FIGURE 2 is a partial cross-section taken along line 2—2 of FIGURE 1 and showing the top of the wick within the boiler compartment.

FIGURE 3 is a side view of another form of the hypsometer, having a long straight condensation tube.

FIGURE 4 is a cross-sectional view of the hypsometer similar to FIGURE 2, but employing a spiral spring retaining means instead of a spring washer.

FIGURE 5 is a fragmentary cross-sectional view on an enlarged scale showing the spiral spring of FIGURE 4 inside the boiler tube.

FIGURE 6 is a horizontal sectional view of the boiler tube showing still another form of retaining member.

FIGURE 7 is a vertical sectional view of the boiler tube shown in FIGURE 6, and is taken along line 7—7 of that figure.

Referring to the drawings, the hypsometer comprises a boiler tube 10 which may be made of glass and is connected to a condensing helix 11. The helix includes a plurality of turns in order to provide efficient cooling in a small space and the upper end of the tube is normally closed by a sealed tip 12 which is broken off just prior to use. The sealed tip insures that no liquid will be lost while the instrument is in storage and further means that the instrument may be transported in any position without losing any of the liquid inside the tube.

The boiler tube 10 is encased in a jacket 13 containing a suitable insulating material 14 which may be expanded polystyrene (Styrofoam). This material fills the space between the jacket walls and the boiler tube and effectively insulates the boiler tube from ambient sources of heat. The foam material also provides a shock mounting for the boiler tube.

The boiler tube 10 contains a wick 15 which is formed of an inert material such as fiberglass and this wick is axially mounted within the boiler tube and surrounded by a packing material 16 which may be glass wool. An electric heater element 17 is wound around the wick 15 and the leads 18 which connect the heater to an external source of potential 20 are sealed in the bottom portion 21 of the boiler tube 10. A manually adjustable rheostat 22 is connected in series with battery 20 in order to adjust the amount of heat applied to the liquid within the boiler tube.

At the top of the wick 15 one or more thermistors 23 are secured within the wick material. Lead-in wires for these thermistors are positioned within the wick material as shown in the drawing and are brought out through the glass container by means of seal 21 at the bottom of the tube, thereby increasing the strength of the assembly. The connecting wires 24 to these thermistors are connected to a bridge circuit 25 by means of a switch 26 which may be used to connect either one of the two thermistors to one arm of the bridge circuit. The other three arms of the bridge are made up of resistors 27, 28, and 30. A source of potential 31, which may be a battery, is connected between two opposite junction points of the bridge while the other two junction points are connected to a meter 32 or to a combination amplifier and meter.

While thermistors are the preferred form of temperature sensitive components, other components may be used. Single or multiple thermo-junctions can be employed with sensitive voltmeters or other suitable measuring means.

Since the liquid in the hypsometer may boil for considerable periods of time it is necessary that the wick 15 and the surrounding absorbent material 16 be kept from being pushed up into the tube 11 by some securing means. One means of holding the wick and surrounding material in their desired positions includes a washer spring 33 which is formed with radial slots 34 as indicated in FIGURE 2, these slots permitting the escape of the vapor from the wick 15 and the surrounding glass wool 16. Other forms of retaining means are shown in FIGURES 4–7, inclusive.

The operation of this device is as follows: The hypsometer is installed in an airplane or other portable conveying means and the tip 12 is broken off. The rheostat 22 is adjusted to provide sufficient current for boiling the liquid within the boiler tube, and as soon as the liquid boils, a reading may be taken on meter 32 which may be calibrated to read directly in pressure units or in distance above the ground. The vapor which is boiled away from the liquid material in the boiler tube is collected on the inside surface of the helix 11 and after being condensed, runs down the inside surface of the condensing tube and flows through the slots 34 in washer 33.

If this device is installed in an airplane or a balloon, an increase in altitude lowers the boiling point and also lowers the amount of heat required for boiling off the liquid. For this reason, as the altitude is increased, rheostat 22 should be adjusted to increase the resistance (or the battery voltage changed) and provide less current for the heaters element 17. The reverse is true when the airplane or balloon is reducing its altitude.

The helix 11 is made long enough and sealed at its upper end so that all the boiled liquid will be condensed on its inside surface and return to the boiler compartment. In this way, the liquid is conserved and the operative life of the hypsometer is extended.

It has been found that a number of liquids can be used in the boiler tube with good results. However, methylcyclohexane, research grade, has been found to give the best results and should be employed for the greatest accuracy.

The hypsometer shown in FIGURE 3 is the same as the form shown in FIGURE 1 except that it has a long straight condensation tube 11a instead of the helix. This form is easier to make and the condensed vapors return more quickly to the boiler tube but it requires more room when installed.

FIGURES 4 and 5 show the boiler tube with a spring type retaining means 35 to retain material 16 in place. The spring is wound as a spiral with its outside diameter slightly larger than the inside diameter of the boiler tube so that when it is forced into the boiler tube it will be retained in its position by friction.

FIGURES 6 and 7 show another type of retaining means made with a split cylinder 37. This cylinder is made of spring material and has a series of inwardly turned extensions 38 which hold the boiler material 16 in place. It is obvious that many other forms of retaining means can be used such as woven screen material, perforated metal or plastic washers, and washers made of matted fiber glass.

From the foregoing description it will be evident that there has been provided a highly efficient pressure measuring apparatus, having advantages of extended life, accuracy, and small size, and which can be kept in storage for an indefinite length of time.

Having thus fully described the invention, what is claimed as new and desired to be secured by Letters Patent of the United States, is:

1. A pressure measuring apparatus comprising, a container open at one end to ambient pressure, said container including a hollow cylindrical boiler tube portion containing a liquid and a condenser portion formed in a helix, a wick axially mounted within said boiler tube in communication with the liquid, a temperature responsive resistor positioned at the top of the wick and connected to lead-in conductors embedded in and passing downwardly through the wick material, an electrical heater within the boiler tube for heating the liquid to its boiling point, a source of potential connected to said resistor and heater, conductive leads for the heater, said resistor and heater leads sealed through the boiler tube wall adjacent its lower end and means for measuring the temperature of the resistor to determine the ambient pressure.

2. A pressure measuring apparatus as set forth in claim 1 wherein the normally open end of said boiler tube is closed prior to use, thereby preventing the evaporation of the liquid when stored.

3. A pressure measuring apparatus as set forth in claim 1 wherein said liquid is methylcyclohexane.

4. A pressure measuring apparatus comprising, a cylindrical container normally open at one end to ambient pressure, said container including a hollow cylindrical boiler tube portion containing a liquid and a condenser portion formed in a helix, a wick axially mounted within said boiler tube in commnuication with the liquid and held in place by a resilient member, a temperature responsive resistor positioned at the top of the wick and connected to lead-in conductors embedded in and passing downwardly through the wick material, an electrical heater within the boiler tube in communication with the liquid and held in heater surrounding the wick adjacent to its bottom portion, a source of electrical power connected to said heater in series with an adjustable resistor for varying the amount of heat supplied to the liquid, conductive leads for the heater, said resistor and heater leads sealed through the boiler tube wall adjacent its lower end and means for determining the resistance of said temperature responsive resistor to determine the ambient pressure.

References Cited by the Examiner

UNITED STATES PATENTS

| | | | |
|---|---|---|---|
| 2,677,279 | 5/54 | Rich | 73—384 |
| 2,741,921 | 4/56 | Windsor et al. | 73—384 |
| 2,832,219 | 4/58 | Sapoff et al. | 73—384 |
| 2,901,909 | 9/59 | Hobrough | 73—384 |

RICHARD C. QUEISSER, *Primary Examiner.*

ROBERT L. EVANS, *Examiner.*